(12) United States Patent
Tanaka et al.

(10) Patent No.: US 10,781,810 B2
(45) Date of Patent: Sep. 22, 2020

(54) VALVE AND FLUID CONTROL DEVICE

(71) Applicant: Murata Manufacturing Co., Ltd., Kyoto (JP)

(72) Inventors: Nobuhira Tanaka, Kyoto (JP); Hiroyuki Yokoi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 16/367,477

(22) Filed: Mar. 28, 2019

(65) Prior Publication Data

US 2019/0226472 A1     Jul. 25, 2019

Related U.S. Application Data

(63) Continuation of application No. PCT/JP2018/019459, filed on May 21, 2018.

(30) Foreign Application Priority Data

May 31, 2017     (JP) .................................. 2017-107974

(51) Int. Cl.
*F04B 45/047* (2006.01)
*F16K 15/14* (2006.01)
(Continued)

(52) U.S. Cl.
CPC .............. *F04B 45/047* (2013.01); *F16K 7/17* (2013.01); *F16K 15/10* (2013.01); *F16K 15/14* (2013.01); *Y10T 137/7914* (2015.04)

(58) Field of Classification Search
CPC ...... F04B 45/047; F04B 45/04; F04B 43/046; F04B 39/10; F04B 39/1093;
(Continued)

(56) References Cited

U.S. PATENT DOCUMENTS 1,359,006 A * 11/1920 Wardwell .................. F16K 1/42
                                                        137/516.15
1,957,867 A *  5/1934 Rike ...................... F04B 53/127
                                                        137/516.11
(Continued)

FOREIGN PATENT DOCUMENTS

CN        102459899 A      5/2012
JP        S63-009575 U1    1/1988
(Continued)

OTHER PUBLICATIONS

Written Opinion for International Application No. PCT/JP2018/019459, dated Aug. 21, 2018.
(Continued)

*Primary Examiner* — William M McCalister
(74) *Attorney, Agent, or Firm* — Pearne & Gordon LLP

(57) ABSTRACT

A valve includes a first plate (10) having a first through hole (100), a second plate (20) having a second through hole (210) that does not face the first through hole (100), a valve chamber (55) formed by being surrounded by the first plate (10) and the second plate (20), and a valve body (30) disposed in the valve chamber (55) and having a third through hole (300) that does not face the first through hole (100) and that faces the second through hole (200), the valve body (30) being movable up and down between the first plate (10) and the second plate (20). In addition, a second opening area of the second through hole (210) is smaller than a third opening area of the third through hole (300), and the second through hole (210) is located in the third through hole (300) when viewed from a front.

16 Claims, 6 Drawing Sheets

(51) Int. Cl.
*F16K 7/17* (2006.01)
*F16K 15/10* (2006.01)

(58) Field of Classification Search
CPC ........ F04B 39/1066; F16K 7/17; F16K 15/10; F16K 15/14; F16K 15/023; Y10T 137/7914
USPC .................................................... 137/533.19
See application file for complete search history.

(56) References Cited

U.S. PATENT DOCUMENTS

| | | | | |
|---|---|---|---|---|
| 2,350,215 | A * | 5/1944 | Christensen | A01K 9/005 119/71 |
| 2,391,211 | A * | 12/1945 | White | F04F 1/06 417/118 |
| 3,495,620 | A * | 2/1970 | Bazell | F16K 31/08 137/529 |
| 3,572,377 | A * | 3/1971 | Graham et al. | F16K 15/023 137/513.7 |
| 4,531,543 | A * | 7/1985 | Markley | F16K 15/02 137/513.3 |
| 4,867,200 | A * | 9/1989 | Markley | F16K 15/028 137/515.7 |
| 6,250,201 | B1 * | 6/2001 | Pagels | F15B 7/00 91/443 |
| 2003/0070712 | A1 * | 4/2003 | Koo | F16K 15/02 137/496 |
| 2003/0223895 | A1 * | 12/2003 | Lee | F04B 39/1066 417/569 |
| 2005/0031476 | A1 * | 2/2005 | Antufjew | F04B 53/108 417/545 |
| 2009/0232684 | A1 * | 9/2009 | Hirata | F04B 39/1093 417/413.2 |
| 2010/0196177 | A1 * | 8/2010 | Hirata | F04B 43/046 417/413.2 |
| 2017/0218949 | A1 * | 8/2017 | Yokoi | F16K 7/17 |
| 2018/0051686 | A1 * | 2/2018 | Tanaka | F04B 19/22 |
| 2018/0187672 | A1 * | 7/2018 | Tanaka | F04B 45/04 |
| 2019/0226472 | A1 * | 7/2019 | Tanaka | F16K 15/10 |

FOREIGN PATENT DOCUMENTS

| | | |
|---|---|---|
| JP | 2012-528981 A | 11/2012 |
| WO | 2010/139918 A1 | 12/2010 |
| WO | 2016/063711 A1 | 4/2016 |
| WO | 2016/181833 A1 | 11/2016 |
| WO | 2017/038565 A1 | 3/2017 |

OTHER PUBLICATIONS

International Search Report for International Application No. PCT/JP2018/019459, dated Aug. 21, 2018.

* cited by examiner

→ : FLOW OF FLUID

—•— FLOW RATE
--•-- POWER CONSUMPTION

→ : FLOW OF FLUID

VALVE AND FLUID CONTROL DEVICE

This is a continuation of International Application No. PCT/JP2018/019459 filed on May 21, 2018 which claims priority from Japanese Patent Application No. 2017-107974 filed on May 31, 2017. The contents of these applications are incorporated herein by reference in their entireties.

BACKGROUND OF THE DISCLOSURE

Field of the Disclosure

The present disclosure relates to a valve and a fluid control device that includes the valve.

Description of the Related Art

In the related art, there is disclosed a rectification mechanism that includes two metal plates and a valve body in a diaphragm pump using a piezoelectric body.

In the structure described in Patent Document 1, when air flows in a forward direction, a valve body operates so as to open a flow path, and when the air flows in a reverse direction, the valve body operates so as to close the flow path. This prevents backflow, and airflow in one direction is generated.

Patent Document 1: Japanese Unexamined Patent Application Publication (Translation of PCT Application) No. 2012-528981

BRIEF SUMMARY OF THE DISCLOSURE

However, in the case of employing the structure described in Patent Document 1, the valve body vibrates when the direction of the airflow is reversed, and the valve body and the metal plates abut against each other. In particular, in a high-frequency region of 20 kHz or higher, the valve body and the metal plates abut against each other more frequently, and it is very likely that the valve body will become worn and will eventually be torn.

Accordingly, it is an object of the present disclosure to provide a structure capable of preventing a valve body from being torn as a result of the valve body abutting against other components and being worn away.

A valve according to the present disclosure includes a first plate having a first through hole, a second plate having a second through hole that does not face the first through hole, a valve chamber formed by being surrounded by the first plate and the second plate, and a valve body disposed in the valve chamber and having a third through hole that does not face the first through hole and that faces the second through hole, the valve body being movable up and down between the first plate and the second plate. A second opening area of the second through hole is smaller than a third opening area of the third through hole, and the second through hole is located in the third through hole when viewed from a front.

With this configuration, when viewed from the front, the opening area of the second through hole of the second plate is smaller than the opening area of the third through hole of the valve body, and an edge of the second through hole does not overlap with an edge of the third through hole. Thus, occurrence of a phenomenon in which the valve body curls up into the second through hole as a result of a peripheral edge portion of the third through hole coming into contact with the edge of the second through hole is suppressed. As a result, occurrence of, for example, the tearing of the valve body in the vicinity of the third through hole can be suppressed.

In the valve according to the present disclosure, it is preferable that a shape of the opening surface of the second through hole is similar to a shape of the opening surface of the third through hole, the shape of the opening surface of the second through hole is not a reversed shape of the shape of the opening surface of the third through hole, and a size of the opening surface of the second through hole is smaller than a size of the opening surface of the third through hole while an aspect ratio of the opening surface of the second through hole is the same as an aspect ratio of the opening surface of the third through hole.

With this configuration, even if there are some errors in the positions of the third through hole and the second through hole, the probability that the third through hole and the second through hole will overlap with each other can be reduced. Thus, the occurrence of a phenomenon in which the valve body curls up into the second through hole as a result of the peripheral edge portion of the third through hole coming into contact with the edge of the second through hole is suppressed. As a result, the occurrence of, for example, the tearing of the valve body in the vicinity of the third through hole can be suppressed.

In the valve according to the present disclosure, it is preferable that the second through hole and the third through hole each have a circular shape.

With this configuration, the opening surface of the third through hole and the opening surface of the second through hole have similar shapes that do not lean to one side in any direction when viewed in a plan view, and thus, even if there are some deviations in the positions of the third through hole and the second through hole, the probability that the third through hole and the second through hole will overlap with each other can be further reduced. Therefore, curling up of the valve body into the second through hole can be further suppressed.

In the valve according to the present disclosure, a first opening area of the first through hole may be larger than the second opening area.

With this configuration, the first opening area of the first through hole is larger than the second opening area of the second through hole, and thus, the first through hole does not become a bottleneck of the flow rate and the flow velocity of a fluid.

In the valve according to the present invention, the first opening area of the first through hole may be smaller than the third opening area.

With this configuration, the first opening area of the first through hole is smaller than the third opening area of the third through hole, and thus, the third through hole does not become a bottleneck of the flow rate and the flow velocity of a fluid.

A fluid control device according to the present disclosure includes the valve and a piezoelectric blower having a discharge hole from which a fluid is to be sent out. The discharge hole communicates with the first through hole.

With this configuration, a fluid control device capable of preventing tearing of a valve body and capable of sending out a fluid can be realized.

A fluid control device according to the present disclosure includes the valve and a piezoelectric blower having a suction hole through which a fluid is to be sucked. The suction hole communicates with the second through hole.

With this configuration, a fluid control device capable of preventing the tearing of a valve body and capable of causing a fluid to flow in can be realized.

According to the present disclosure, the tearing of a valve body can be prevented.

DETAILED DESCRIPTION OF THE DISCLOSURE

First Embodiment

Figure 1:
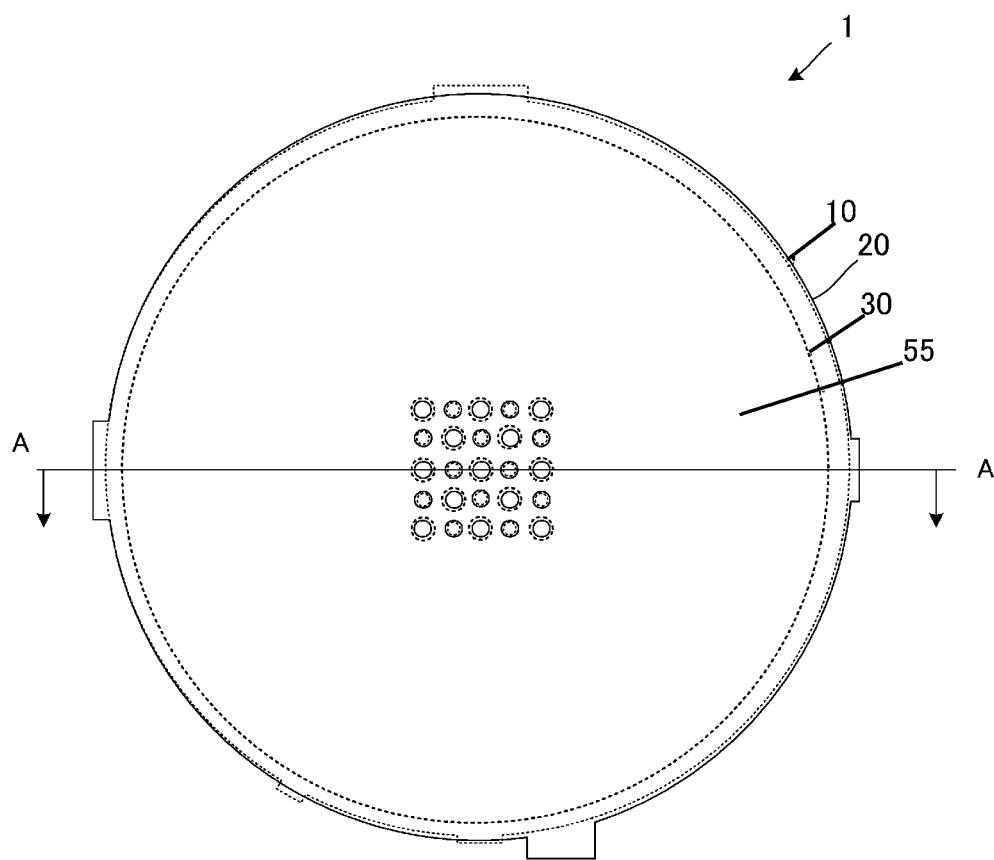
FIG. 1 is a front view of a valve according to a first embodiment of the present disclosure.
Figure 2:
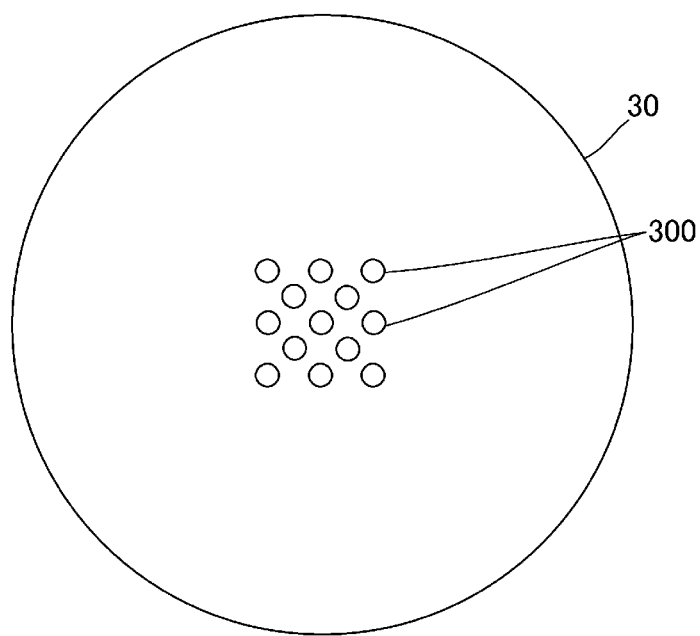
FIG. 2 is a front view illustrating a configuration of a portion of the valve according to the first embodiment of the present disclosure.
Figure 3:
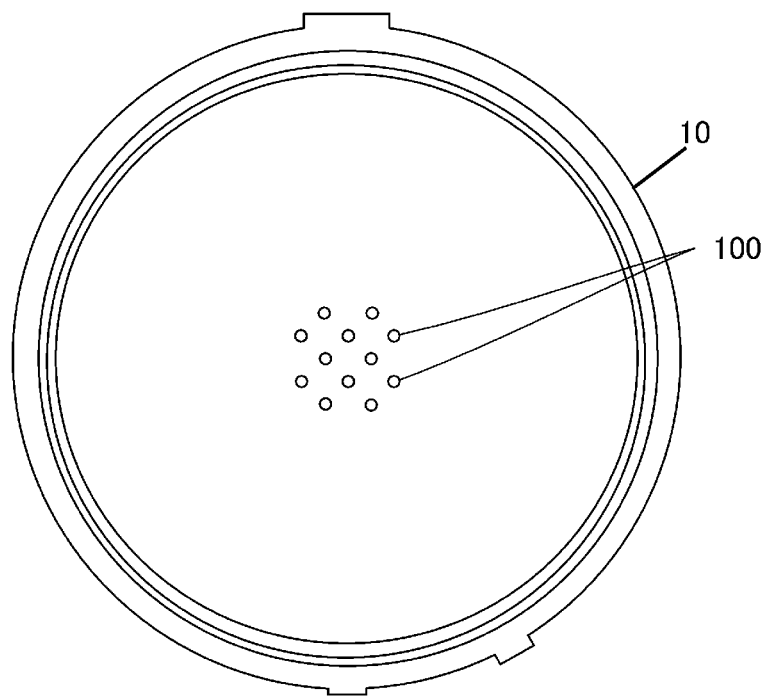
FIG. 3 is a front view illustrating a configuration of a portion of the valve according to the first embodiment of the present disclosure.
Figure 4:
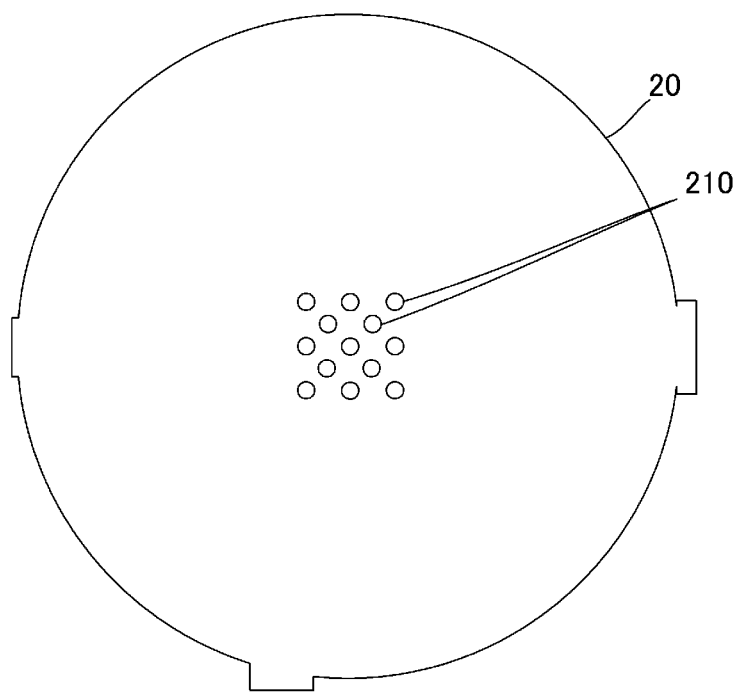
FIG. 4 is a front view illustrating a configuration of a portion of the valve according to the first embodiment of the present disclosure.
Figure 5:
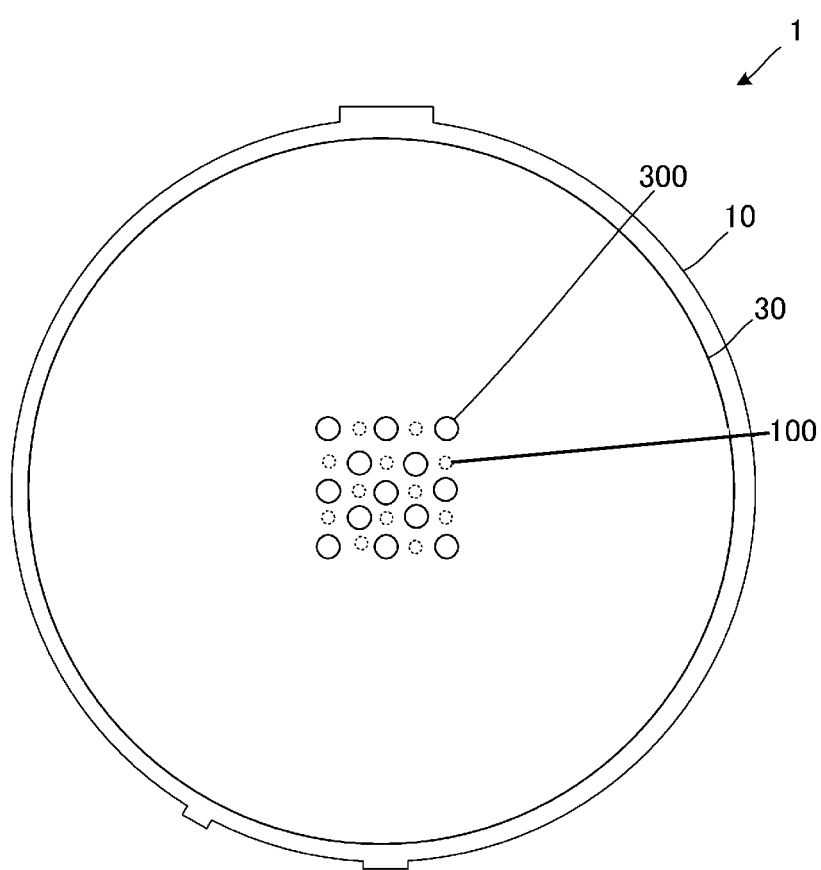
FIG. 5 is a front view illustrating, in a superposed manner, the configurations of the portions of the valve according to the first embodiment of the present disclosure.
Figure 6:
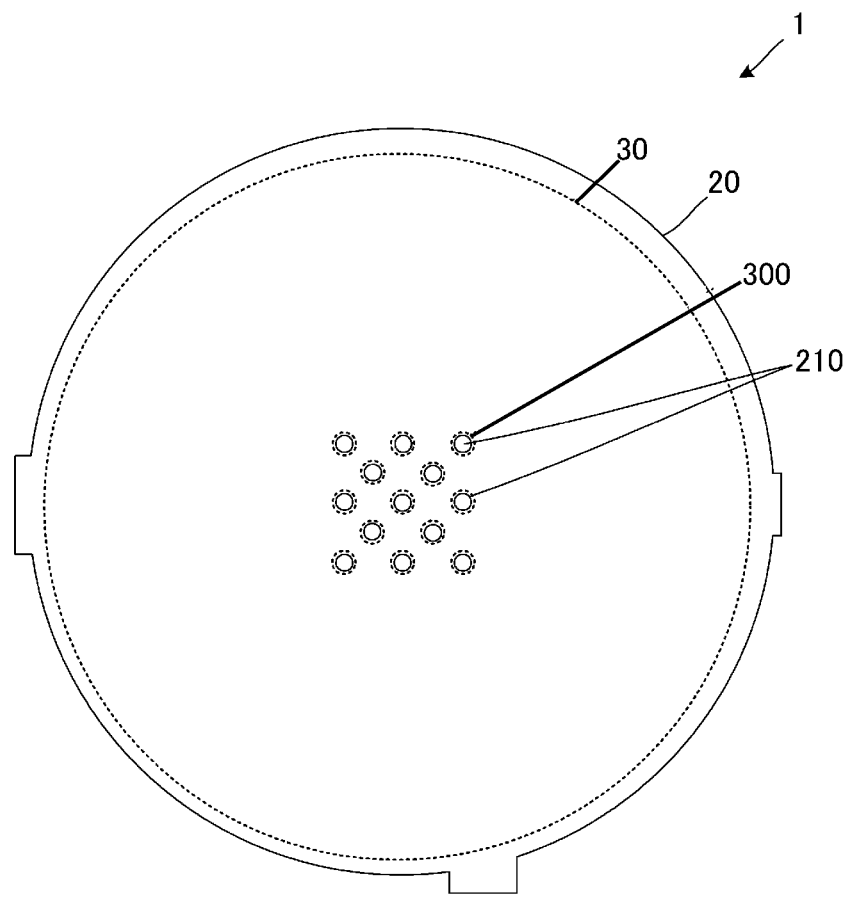
FIG. 6 is a front view illustrating, in a superposed manner, the configurations of the portions of the valve according to the first embodiment of the present disclosure.
Figure 7:
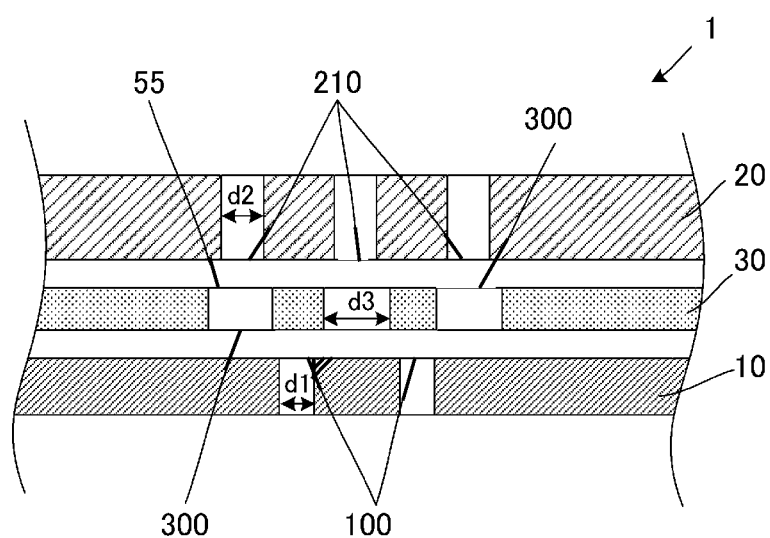
FIG. 7 is an enlarged sectional view illustrating a configuration of the valve according to the first embodiment of the present disclosure.
Figure 8:
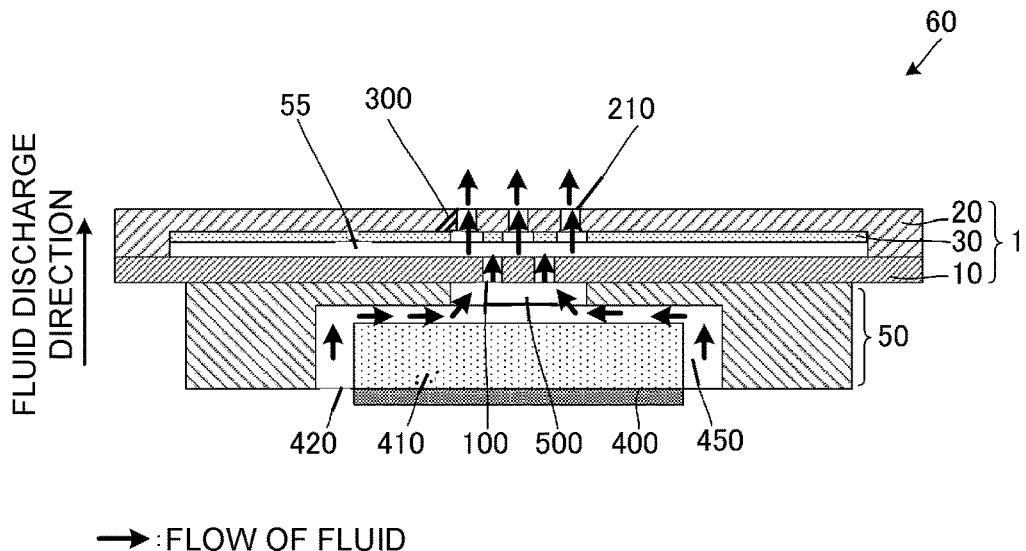
FIG. 8 is a schematic sectional view of a fluid control device that includes the valve according to the first embodiment of the present disclosure.

A valve according to a first embodiment of the present disclosure will be described with reference to the drawings. FIG. 1 is a front view of a valve 1 according to the first embodiment of the present disclosure. FIG. 2 is a front view illustrating a valve body 30 of the valve 1 according to the first embodiment of the present disclosure. FIG. 3 is a front view illustrating a top plate 10 of the valve 1 according to the first embodiment of the present disclosure. FIG. 4 is a front view illustrating an outer plate 20 of the valve 1 according to the first embodiment of the present disclosure. FIG. 5 is a front view illustrating, in a superposed manner, the valve body 30 and the top plate 10 of the valve 1 according to the first embodiment of the present disclosure. FIG. 6 is a front view illustrating, in a superposed manner, the outer plate 20 and the valve body 30 of the valve 1 according to the first embodiment of the present disclosure. FIG. 7 is a sectional view of the valve 1 according to the first embodiment of the present disclosure taken along line A-A of FIG. 1. FIG. 8 is a sectional view of a fluid control device 60 that includes the valve 1 according to the first embodiment of the present disclosure. Note that, in the drawings, some reference signs are omitted, and the dimensional relationship is suitably changed in order to make a configuration easy to see.

As illustrated in FIG. 1, the valve 1 includes the top plate 10, the outer plate 20, and the valve body 30. When viewed in a plan view (when viewed from the front), the valve 1 has a substantially circular shape. The top plate 10, the valve body 30, and the outer plate 20 are stacked on top of one another in this order such that their flat plates are parallel to one another.

In this configuration, a hollow valve chamber 55 that is surrounded by the top plate 10 and the outer plate 20 is formed, and the valve body 30 is disposed in the valve chamber 55. The top plate 10 and the outer plate 20 are rigid bodies, and the valve body 30 is an elastic body.

The top plate 10 corresponds to a "first plate" according to the present disclosure, and the outer plate 20 corresponds to a "second plate" according to the present disclosure.

As illustrated in FIG. 2, the valve body 30 has a plurality of third through holes 300. For example, each of the third through holes 300 has a cylindrical shape (has a circular shape when viewed in a plan view) and extends through the valve body 30. The third through holes 300 are formed so as to be arranged in a predetermined pattern. When a main surface of the valve body 30 is viewed in a plan view, the third through holes 300 are formed in a center region of the valve body 30.

As illustrated in FIG. 3, the top plate 10 has a plurality of first through holes 100. For example, each of the first through holes 100 has a cylindrical shape (has a circular shape when viewed in a plan view) and extends through the top plate 10. The first through holes 100 are formed so as to be arranged in a predetermined pattern. When a main surface of the top plate 10 is viewed in a plan view, the first through holes 100 are formed in a center region of the top plate 10.

As illustrated in FIG. 4, the outer plate 20 has a plurality of second through holes 210. For example, each of the second through holes 210 has a cylindrical shape (has a circular shape when viewed in a plan view) and extends through the outer plate 20. The second through holes 210 are formed so as to be arranged in a predetermined pattern. When a main surface of the outer plate 20 is viewed in a plan view, the second through holes 210 are formed in a center region of the outer plate 20.

As illustrated in FIG. 5, the plurality of third through holes 300 of the valve body 30 and the plurality of first through holes 100 of the top plate 10 do not overlap with one another when viewed in a plan view in a direction in which the first through holes 100 extend through the top plate 10. In other words, the first through holes 100 and the third through holes 300 do not face one another when viewed in a plan view in the direction in which the first through holes 100 extend through the top plate 10.

As illustrated in FIG. 6, the plurality of second through holes 210 overlap with the plurality of third through holes 300 of the valve body 30 when viewed in a plan view in a direction in which the third through holes 300 extend through the valve body 30. In other words, the second through holes 210 face their respective third through holes 300 when viewed in a plan view in the direction in which the third through holes 300 extend through the valve body 30. The second through holes 210 serve as discharge holes of the outer plate 20 when a fluid is discharged.

FIG. 7 is a sectional view of the valve 1 taken along line A-A of FIG. 1. FIG. 7 illustrates the details of the positional relationship between the first through holes 100, the second through holes 210, and the third through holes 300.

The width of each of the first through holes 100 (the diameter of each of the first through holes 100 in the present embodiment) will be denoted by reference sign d1. The width of each of the second through holes 210 (the diameter of each of the second through holes 210 in the present embodiment) will be denoted by reference sign d2. The width of each of the third through holes 300 (the diameter of each of the third through holes 300 in the present embodiment) will be denoted by reference sign d3. The width d1 of each of the first through holes 100 is smaller than the width d2 of each of the second through holes 210. In addition, the width d2 of each of the second through holes 210 is smaller than the width d3 of each of the third through holes 300.

The second through holes 210 and the third through holes 300 are formed such that each of the second through holes 210 and a corresponding one of the third through holes 300 face each other when viewed in a plan view in a direction in which the second through holes 210 extend through the outer plate 20. In other words, each of the second through holes 210 is located in a region inside the corresponding third through hole 300 when viewed in a plan view in the direction in which the second through holes 210 extend through the outer plate 20. As a result, the probability that the valve body 30 will curl up and come into contact with edges of the second through holes 210 can be reduced.

Note that results of an experiment conducted by employing the above-described configuration will now be described. As a specific structure of the present embodiment, the width d2 of each of the second through holes 210 is set to 0.6 mm, and the width d3 of each of the third through holes 300 is set to 0.7 mm. In addition, as a specific comparative structure, the width d2 of each of the second through holes 210 and the width d3 of each of the third through holes 300 are each set to 0.6 mm. Note that, since the shape of each of the through holes is a circular shape, the width of each of the through holes in the present embodiment is equal to the diameter of the through hole.

The experiment was conducted by using 20 samples each having the structure of the present embodiment and other 20 samples each having the comparative structure. In each of the samples having the structure of the present embodiment, the tearing of the valve body 30 did not occur even after an accumulated time of 500 hours has passed. However, among the valve bodies of the other 20 samples each having the comparative structure, the valve bodies of 2 samples were torn when an accumulated time of 100 hours has passed, and in addition, the valve bodies of 8 more samples were torn when an accumulated time of 500 hours has passed. It is assumed that this tearing occurs because the portions of the valve body 30 in the vicinity of the third through holes 300 curl up as a result of repeatedly coming into contact with the edges of the second through holes 210.

In other words, by employing a configuration in which the width d2 of each of the second through holes 210 is smaller than the width d3 of each of the third through holes 300, the curling up of the valve body 30 can be effectively suppressed.

In addition, it is preferable that the edge of each of the second through holes 210 and the edge of the corresponding third through hole 300 be separated by 50 or more. Note that the edge of each of the second through holes 210 is an edge of the second through hole 210 on the side on which the valve body 30 is disposed, and the edge of each of the third through holes 300 is an edge of the third through hole 300 on the side on which the outer plate 20 is disposed. As a result, an acceptable range of the positional deviation between the outer plate 20 and the valve body 30 can be increased, and the curling up of the valve body 30 can be further suppressed.

In addition, the shape of an opening surface of each of the second through holes 210 and the shape of an opening surface of each of the third through holes 300 are similar to each other. Consequently, the edge of each of the second through holes 210 is less likely to overlap with the edge of the corresponding third through hole 300, and the acceptable range of the positional deviation between the outer plate 20 and the valve body 30 can be increased.

Note that, as in the present disclosure, in the case where each of the second through holes 210 is located in the corresponding third through hole 300 when viewed from the front, the whole peripheral edges of the third through holes 300 cannot be visually recognized when the second through holes 210 are viewed in a direction from the outer plate 20 toward the valve chamber 55. In addition, unlike the present disclosure, in the case where each of the second through holes 210 is not located in the corresponding third through hole 300 when viewed from the front, when the valve 1 is operated for a long period of time, the edges of the second through holes 210 come into contact with the valve body 30, which in turn results in the formation of the circumferential-shaped or arc-shaped dents. In contrast, as in the present disclosure, in the case where each of the second through holes 210 is located in the corresponding third through hole 300 when viewed from the front, even when the valve 1 is operated for a long period of time, such circumferential-shaped or arc-shaped dents will not be formed in the valve body 30.

The valve 1 having such a configuration forms, together with a piezoelectric blower 50, a fluid control device 60 as illustrated in FIG. 8. The piezoelectric blower 50 includes a piezoelectric element 400, a pump chamber 410, an inflow hole 420, a flow path 450, and a discharge hole 500. The discharge hole 500 is formed on the side on which the top plate 10 of the valve 1 is disposed. The discharge hole 500 corresponds to a "discharge hole" of a valve according to the present disclosure.

A fluid flows into the discharge hole 500 via the inflow hole 420 and the flow path 450 as a result of the vibration of the piezoelectric element 400. The fluid passes through the first through holes 100 and pushes up the valve body 30 in a direction in which the fluid is to be discharged. The fluid passes through the third through holes 300 of the valve body 30 and flows out from the second through holes 210.

Here, as a result of the fluid pushing up the valve body 30 in the direction in which the fluid is to be discharged, the valve body 30 is brought into contact with the outer plate 20. In this state, the second through holes 210 are located in their respective third through holes 300 when the outer plate 20 is viewed from the front. As described above, each of the second through holes 210 is smaller than each of the third through holes 300, and the edges of the second through holes 210 do not overlap with the edges of the third through holes 300 in a state where the valve body 30 is in contact with the outer plate 20. Thus, the edge portions of the third through holes 300 do not curl up into their respective second through holes 210. Therefore, the tearing of the valve body 30 can be suppressed.

In addition, it is preferable that the total opening area of the plurality of the first through holes 100 be larger than the total opening area of the plurality of the second through holes 210. In this case, the flow rate of the fluid that flows through the plurality of first through holes 100 within a certain period of time is higher than the flow rate of the fluid that flows through the second through holes 210 within the certain period of time. Consequently, the first through holes 100 do not become a bottleneck when the fluid is discharged. Note that the width d1, which is the width of each of the first through holes 100, may be larger than the width d2, which is the width of each of the second through holes 210. This also can eliminate such a bottleneck.

In addition, it is preferable that the total opening area of the plurality of first through holes 100 be smaller than the total opening area of the plurality of third through holes 300. In this case, the flow rate of the fluid that flows through the plurality of third through holes 300 within a certain period of time is higher than the flow rate of the fluid that flows through the first through holes 100 within the certain period of time. Consequently, the third through holes 300 do not become a bottleneck when the fluid is discharged. Note that the width d1, which is the width of each of the first through holes 100, may be smaller than the width d3, which is the width of each of the third through holes 300. This also can eliminate such a bottleneck.

In addition, the width d2, which is the width of each of the second through holes 210, may be larger than the width d1, which is the width of each of the first through holes 100, and may be smaller than the width d3, which is the width of each of the third through holes 300.

Figure 9:
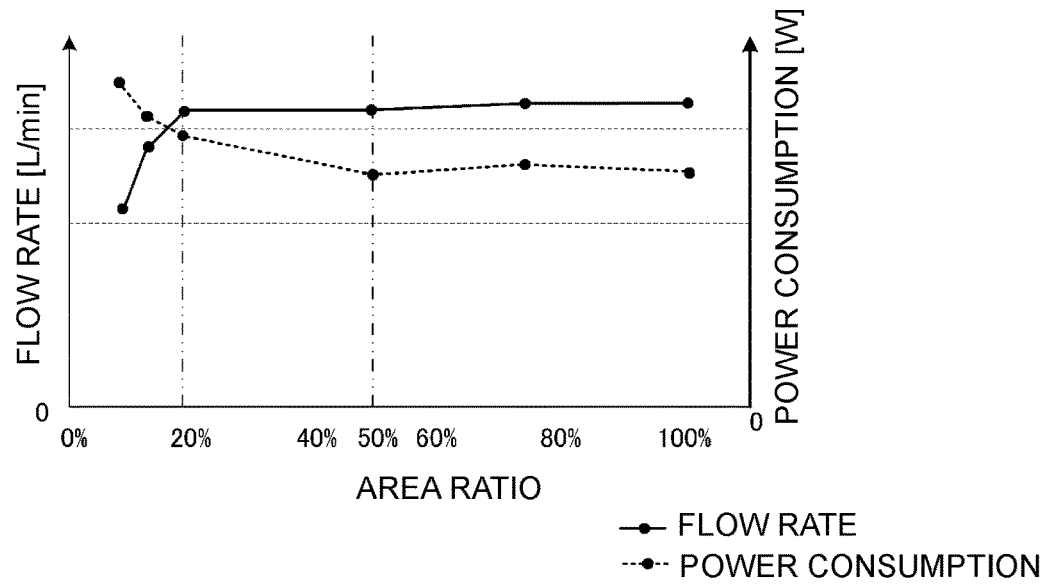
FIG. 9 is a graph illustrating a relationship between the ratio of an opening area of a second through hole to an opening area of a third through hole according to the first embodiment of the present disclosure, and the flow rate of a fluid that is discharged by the valve and the power consumption of a pump.

FIG. 9 is a graph illustrating a relationship between the area ratio, which is the ratio of the opening area of each of the second through holes 210 to the opening area of each of the third through holes 300, and the flow rate of the fluid that is discharged by the valve 1 and the power consumption of a pump on the same voltage. More specifically, this relationship is defined by using a mathematical expression "area ratio=(the opening area of the second through hole/the opening area of the third through hole)".

The flow rate is substantially constant when the opening area of each of the third through holes 300 is 100, and the opening area of each of the second through holes 210 is 20, that is, when the area ratio is 20% or more. Thus, the area ratio may be 20% or more as a configuration with which the flow rate does not decrease.

The power consumption is substantially constant when the opening area of each of the third through holes 300 is 100, and the opening area of each of the second through holes 210 is 50, that is, when the area ratio is 50% or more. In addition, as mentioned above, the flow rate does not decrease. Thus, the area ratio may be 50% or more as a configuration with which the power consumption does not increase while the flow rate does not decrease.

Second Embodiment

Figure 10:
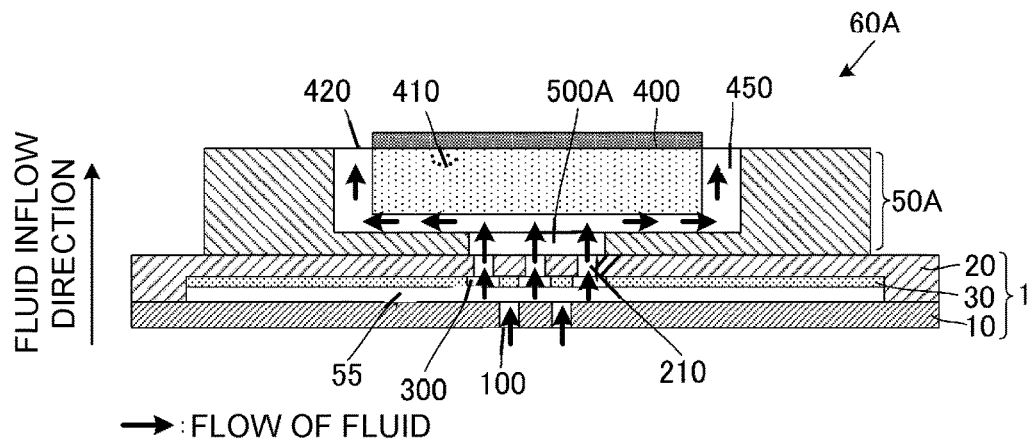
FIG. 10 is a schematic sectional view of a fluid control device that includes a valve according to a second embodiment of the present disclosure.

A fluid control device according to a second embodiment of the present disclosure will now be described with reference to the drawings. FIG. 10 is a sectional view of a fluid control device 60A according to the second embodiment of the present disclosure that includes the valve 1.

As illustrated in FIG. 10, the difference between the fluid control device 60A according to the second embodiment and the fluid control device 60 according to the first embodiment is that, in the fluid control device 60A, a piezoelectric blower 50A is disposed on the side on which the outer plate 20 of the valve 1 is disposed. In other words, the piezoelectric blower 50A according to the present embodiment is used as a device that sucks a fluid.

The piezoelectric blower 50A has a suction hole 500A. The suction hole 500A is formed on the side on which the outer plate 20 of the valve 1 is disposed. The suction hole 500A corresponds to a "suction hole" of the valve according to the present disclosure.

The rest of the configuration of the fluid control device 60A is similar to that of the fluid control device 60, and the descriptions of similar components will be omitted. Note that, in the drawings, some reference sings are omitted, and the dimensional relationship is suitably changed in order to make the configuration easy to see.

A fluid is sucked through the suction hole 500A of the valve 1 as a result of the piezoelectric element 400 vibrating. Along with this, the fluid is sucked into the first through holes 100 of the valve 1 from the outside.

Also with such a configuration, since each of the second through holes 210 is smaller than each of the third through holes 300, the edge portions of the third through holes 300 do not curl up into their respective second through holes 210. Therefore, the tearing of the valve body 30 can be suppressed.

In addition, it is preferable that the total opening area of the plurality of first through holes 100 be larger than the total opening area of the plurality of second through holes 210. In this case, the flow rate of the fluid that flows through the plurality of first through holes 100 within a certain period of time is higher than the flow rate of the fluid that flows through the second through holes 210 within the certain period of time. Consequently, the first through holes 100 do not become a bottleneck when the fluid is discharged. Note that the width d1, which is the width of each of the first through holes 100, may be larger than the width d2, which is the width of each of the second through holes 210. This also can eliminate such a bottleneck.

Third Embodiment

Figure 11:
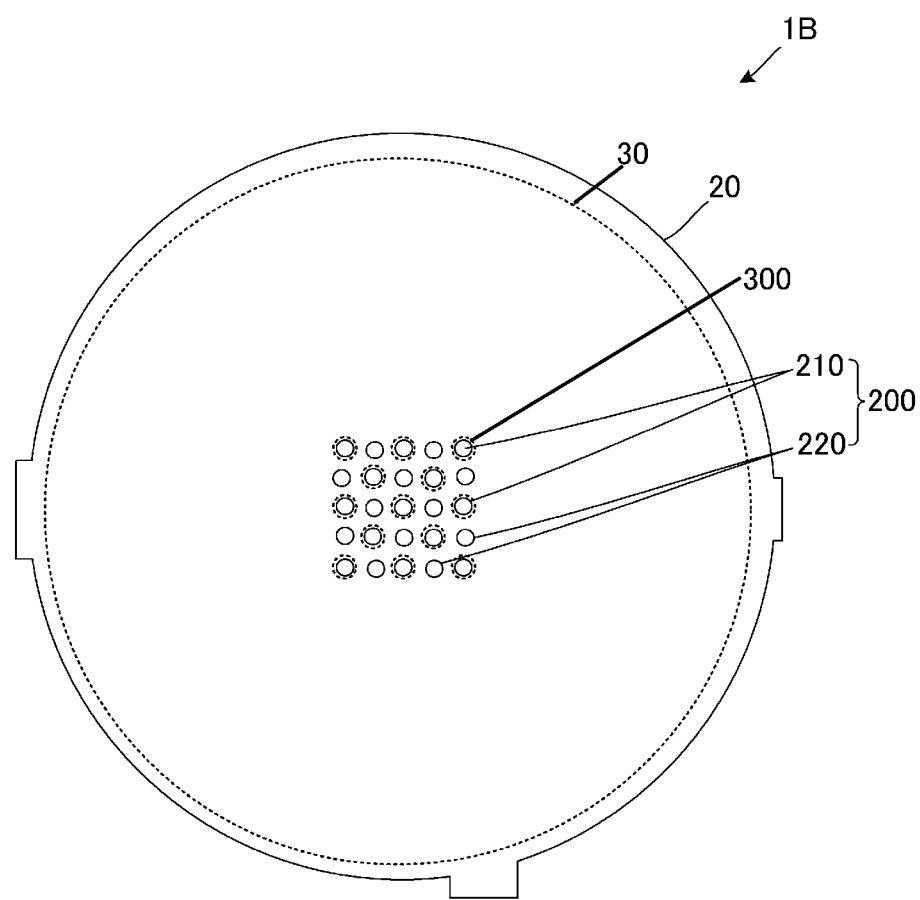
FIG. 11 is a front view illustrating, in a superposed manner, the configurations of the portions of a valve according to a third embodiment of the present disclosure.

A fluid control device according to a third embodiment of the present disclosure will now be described with reference to the drawings. FIG. 11 is a front view illustrating, in a superposed manner, the configurations of the portions of a valve 1B according to the third embodiment of the present disclosure.

As illustrated in FIG. 11, the difference between the valve according to the third embodiment and the valve 1 according to the first embodiment is that the valve according to the third embodiment further has auxiliary holes 220. Outer-plate through holes 200 of the valve 1B include the second through holes 210 and the auxiliary holes 220.

The plurality of second through holes 210 overlap with the plurality of third through holes 300 of the valve body 30, when viewed in a plan view in the direction in which the third through holes 300 extend through the valve body 30. In other words, the second through holes 210 face their respective third through holes 300 when viewed in a plan view in the direction in which the third through holes 300 extend through the valve body 30.

The auxiliary holes 220 of the outer plate 20 and the third through holes 300 of the valve body 30 do not overlap with one another when viewed in a plan view in the direction in which the third through holes extend through the valve body 30. In other words, the auxiliary holes 220 and the third through holes 300 do not face one another when viewed in a plan view in the direction in which the third through holes 300 extend through the valve body 30.

Also, with such a configuration, since each of the second through holes 210 is smaller than each of the third through holes 300, the edge portions of the third through holes 300 do not curl up into their respective second through holes 210. Therefore, the tearing of the valve body 30 can be suppressed.

Note that, although the valve chamber 55 that is surrounded by the top plate 10 and the outer plate 20 has been described in the embodiments of the present disclosure, the present disclosure is not particularly limited to this configuration. For example, the valve chamber 55 may be formed by providing a side-wall plate between the top plate 10 and the outer plate 20 such that the side-wall plate is sandwiched between the top plate 10 and the outer plate 20. In addition, a structural component that corresponds to the side-wall plate may be formed of a plurality of members.

Note that, in each of the embodiments of the present disclosure, the first through holes, the second through holes, and the third through holes each have a substantially circular shape. However, similar advantageous effects can be obtained as long as the first through holes, the second through holes, and the third through holes have similar shapes that are obtained by reducing or increasing the sizes of the holes while the aspect ratio is maintained and without inverting the holes.

d1, d2, d3 width
1 valve
10 top plate
20 outer plate
30 valve body
50, 50A piezoelectric blower
55 valve chamber
60, 60A fluid control device
100 first through hole
200 outer-plate through hole
210 second through hole
220 auxiliary hole
300 third through hole
400 piezoelectric element
410 pump chamber
420 inflow hole
450 flow path
500 discharge hole
500A suction hole

The invention claimed is:

1. A valve comprising:
a first plate having a first through hole;
a second plate having a second through hole, wherein the second through hole does not face the first through hole;
a valve chamber surrounded by the first plate and the second plate; and
a valve body disposed in the valve chamber and having a third through hole, wherein the third through hole does not face the first through hole and faces the second through hole, and the valve body is movable up and down between the first plate and the second plate,
wherein a second opening area of the second through hole is smaller than a third opening area of the third through hole, and
wherein the second through hole appears to be located within the third through hole when viewed from a front.

2. The valve according to claim 1,
wherein a shape of the opening surface of the second through hole is similar to a shape of the opening surface of the third through hole,
the shape of the opening surface of the second through hole is not a reversed shape of the shape of the opening surface of the third through hole, and
a size of the opening surface of the second through hole is smaller than a size of the opening surface of the third through hole while an aspect ratio of the opening surface of the second through hole is the same as an aspect ratio of the opening surface of the third through hole.

3. The valve according to claim 1,
wherein the second through hole and the third through hole each have a circular shape.

4. The valve according to claim 1,
wherein a first opening area of the first through hole is larger than the second opening area.

5. The valve according to claim 1,
wherein the first opening area of the first through hole is smaller than the third opening area.

6. A fluid control device comprising:
the valve according to claim 1; and
a piezoelectric blower having a discharge hole for discharging a fluid,
wherein the discharge hole communicates with the first through hole.

7. A fluid control device comprising:
the valve according to claim 1; and
a piezoelectric blower having a suction hole for sucking a fluid,
wherein the suction hole communicates with the second through hole.

8. The valve according to claim 2,
wherein the second through hole and the third through hole each have a circular shape.

9. A fluid control device comprising:
the valve according to claim 2; and
a piezoelectric blower having a discharge hole for discharging a fluid,
wherein the discharge hole communicates with the first through hole.

10. A fluid control device comprising:
the valve according to claim 3; and
a piezoelectric blower having a discharge hole for discharging a fluid,
wherein the discharge hole communicates with the first through hole.

11. A fluid control device comprising:
the valve according to claim 4; and
a piezoelectric blower having a discharge hole for discharging a fluid,
wherein the discharge hole communicates with the first through hole.

12. A fluid control device comprising:
the valve according to claim 5; and
a piezoelectric blower having a discharge hole for discharging a fluid,
wherein the discharge hole communicates with the first through hole.

13. A fluid control device comprising:
the valve according to claim 2; and
a piezoelectric blower having a suction hole for sucking a fluid,
wherein the suction hole communicates with the second through hole.

14. A fluid control device comprising:
the valve according to claim 3; and
a piezoelectric blower having a suction hole for sucking a fluid,
wherein the suction hole communicates with the second through hole.

15. A fluid control device comprising:
the valve according to claim 4; and
a piezoelectric blower having a suction hole for sucking a fluid,
wherein the suction hole communicates with the second through hole.

16. A fluid control device comprising:
the valve according to claim 5; and
a piezoelectric blower having a suction hole for sucking a fluid,
wherein the suction hole communicates with the second through hole.

\* \* \* \* \*